United States Patent

[11] 3,526,242

| [72] | Inventor | Reinhold Werner<br>Oberstedten, Germany |
|---|---|---|
| [21] | Appl. No. | 769,107 |
| [22] | Filed | Oct. 21, 1968 |
| [45] | Patented | Sept. 1, 1970 |
| [73] | Assignee | Klockner-Humboldt-Deutz<br>Aktiengesellschaft<br>Cologne-Deutz, Germany |
| [32] | Priority | Oct. 25, 1967 |
| [33] | | Germany |
| [31] | | 1,650,067 |

[54] FUNCTION GENERATOR FOR PRODUCING AN OUTPUT WHICH VARIES IN CONFORMITY WITH TWO INPUTS
9 Claims, 8 Drawing Figs.

[52] U.S. Cl. ................................... 137/81.5, 137/83
[51] Int. Cl. ................................... F15c 1/14, F15c 3/12
[50] Field of Search ........................... 137/81.5, 83; 235/201; 91/3

[56] References Cited
UNITED STATES PATENTS

| 2,247,301 | 6/1941 | Lessel | 137/81.5X |
| 3,413,993 | 12/1968 | Ziemel | 137/81.5 |
| 3,451,413 | 6/1969 | Zoerb | 137/81.5 |
| 3,460,556 | 8/1969 | Sowers | 137/81.5 |

*Primary Examiner*—M. Cary Nelson
*Assistant Examiner*—William R. Cline
*Attorney*—Walter Becker

ABSTRACT: The invention pertains to a function generator having an output in the form of a variable pressure which is generated by a constant pressure jet which impacts against a limited area of one end of a bundle of passages which vary in length across the passage bundle in two angularly related directions. The end of the passage bundle opposite the jet opens into a closed chamber and the end of the passage bundle not impacted by the jet is maintained at a constant pressure so the pressure in the chamber varies in accordance with the length of the passages against which the jet impacts. The point of impacting of the jet against the passage bundle is varied by control devices responsive to two inputs.

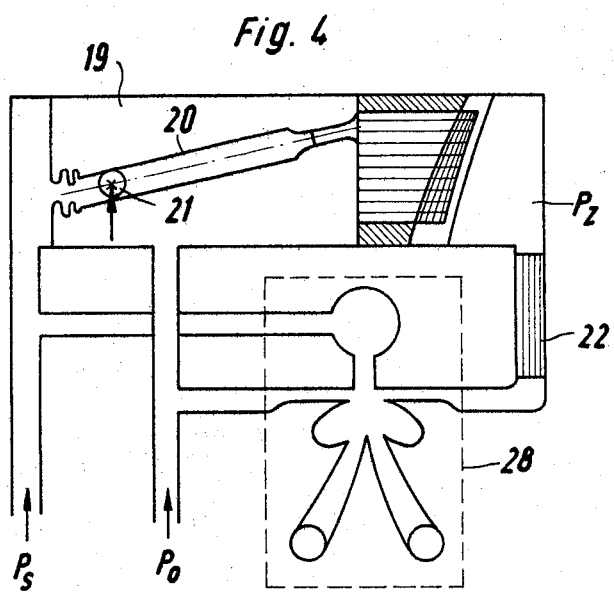
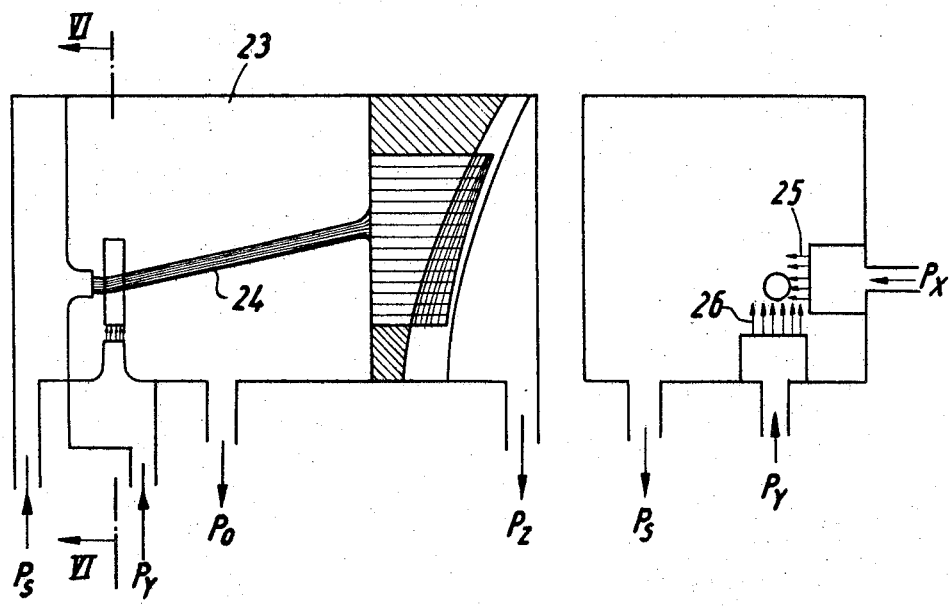

FUNCTION GENERATOR FOR PRODUCING AN OUTPUT WHICH VARIES IN CONFORMITY WITH TWO INPUTS

The present invention relates to a function generator which is adapted to respond to two inputs variable independently of each other.

Such function generators serve for producing any desired function $z = f(x, y)$ in which the inputs are designated with $y$ and $x$ and the output is designated with $z$ and frequently employed in the control technique in the form of so called spacial cams which are axially displaced by one of the inputs and are turned by the other input. The output is then taken off as a rule from said cams by a pin. Inasmuch as the output always has to carry out an adjusting movement and since furthermore the journalling of the spacial cams has a friction inherent thereto, the inputs have to be particularly amplified when falsifications of the value of the output review show a too high frictional resistance is to be avoided. Amplifiers, however, report additional expenses and also increase the liability of the function generator to disturbances.

It is the object of the present invention to provide a function generator which will overcome the above mentioned drawbacks. This object and other objects thereafter of the invention will appear more clearly from the following specification in connection with the accompanying drawings.

FIG. 4 shows a function generator according to the invention with a following fluidic amplifier;

FIG. 5 represents an embodiment according to which the fluid jet to be diverted passes entirely through the space associated therein and is diverted by two flat control jets;

FIG. 6 is a diagrammatic section through the function generator of FIG. 5 along the line VI—VI.

Figure 1:
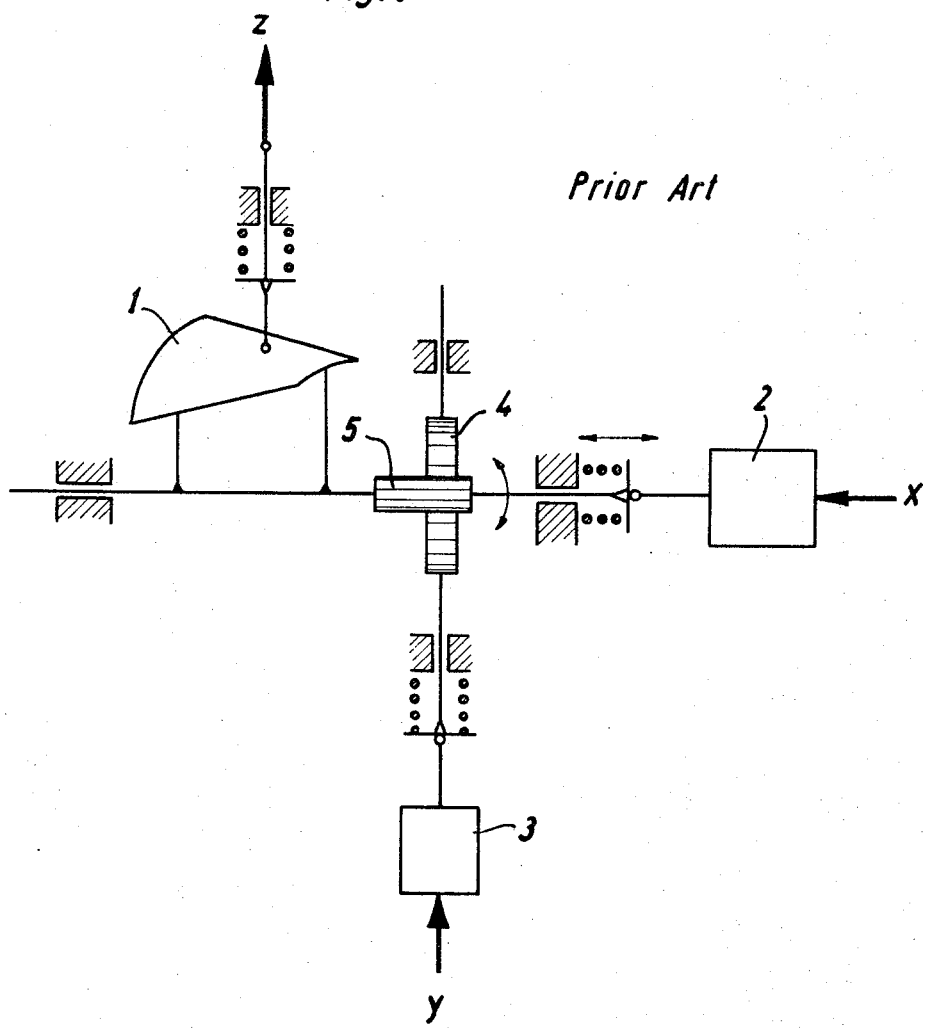
FIG. 1 represents the general known outlay of a function generator with the so called spacial cam.

The problem underlying the present invention has been solved by a function generator according to the present invention which is characterized by the following features:

a. The housing of the function generator comprises two chambers which are separated from each other by a common partition while said separated chambers are in continuous communication with each other by means of narrow passages of different length which are closely bundled in the partition and assure a laminar flow, certain passages being so arranged that when viewing in two directions at a right angle with regard to each other and extending parallel to the partition, the length of the passages successively decreases or increases;

b. From one of the above mentioned two chambers is a liquid or gas jet which is supplied from the outside from a source of constant pressure and directed toward the passages in the partition, said jet being diverted by the two inputs of the generator in the same directions in which the length of the passages in the partition changes;

c. The outflow from the chamber passed through by the liquid or gas jet is effected in a throttled manner in the sense of maintaining a desired pressure in said chamber whereas the chamber on the other side of the partition continuously communicates with the inlet of a pressure measuring device; and d. The cross section of the jet is relatively small with regard to the surface covered by the passages in the partition.

The effect of the function generator according to the invention is based on the fact that depending on the diversion of the fluid jet from a basic position, said jet hits more or less long passages in said partition. The fluid passing through these passages where the jet hits upon the partition into the second chamber and subsequently flows back through the passages not hit by said jet fundamentally produces a pressure increase in said second chamber. The extent of this increase depends on the length of the inflow passages and the total cross section available for the return flow. Thus, when the area of impact of the jet is displaced from one zone to a zone of longer passages, the pressure in the chamber behind the partition drops and correspondingly when the displacement of the impact is effected to a zone of shorter passages, the pressure in the chamber behind the partition increases. By means of a simple calculation it can be shown that the extent of the pressure changes, provided the passages assure laminary flow conditions and the jet cross section is small with regard to the total cross section of the passages, is determined independently of the viscosity of the liquid and primarily by the length of the passages. Thus, each possible combination of the jet diverting inputs $y$ and $x$ has associated therewith a certain impact area of the jet on the bundle of passages.

The advance obtained by the function generator according to the present invention will become obvious by the following facts:

In the first place, the function generator according to the invention represents, so to speak, a friction free device in view of the absence of any mechanical motion transmitting elements with friction inherent thereto. Since, furthermore, the two inputs $x$ and $y$, for purposes of diverting the jet have to overcome merely small spring elastic force, it will be obvious that in most instances power amplifiers for the inputs are not necessary. This also holds true, if according to a further development of the invention, the liquid or gas jet leaves a tiltable pipe closely ahead of the impact area while advantageously the holding of said pipe at the wall which is located opposite the perforated partition, and pertains to a chamber passed through by said pipe, is effected through intervention of a flexible elastic member such as a spring bellows or a thin walled pipe section. The tilting of the jet pipe may be effected by spring bellows or the like responding to changes in the input pressures.

Particularly in those instances in which the fluid jet is formed by an actual liquid and in which the surrounding medium is gaseous, for instance air, there is the advantageous possibility of designing the function generator according to the invention entirely without moveable elements. To this end, the deviation of the liquid jet which passes through the entire chamber without mixing with the surrounding medium is effected by means of two flat control jets effective at the root of said liquid jet.

Referring now to the drawings in detail and in particular to the heretofore known function generator of FIG. 1, the output $z$ on a so called spacial cam 1 is the result of the two inputs $x$ and $y$ which through the intervention of two power amplifiers 2 and 3 is displaced $x$ and by means of a rack 4 and a pinion 5 is turned $y$. The drawback of this function generator is seen in the fact that it comprises a number of structural elements which have to be moved and in connection with which, therefore, frictional forces have to be overcome. In order to avoid any falsification of the output, it is therefore necessary generally to employ power amplifiers 2 and 3.

Figure 2:
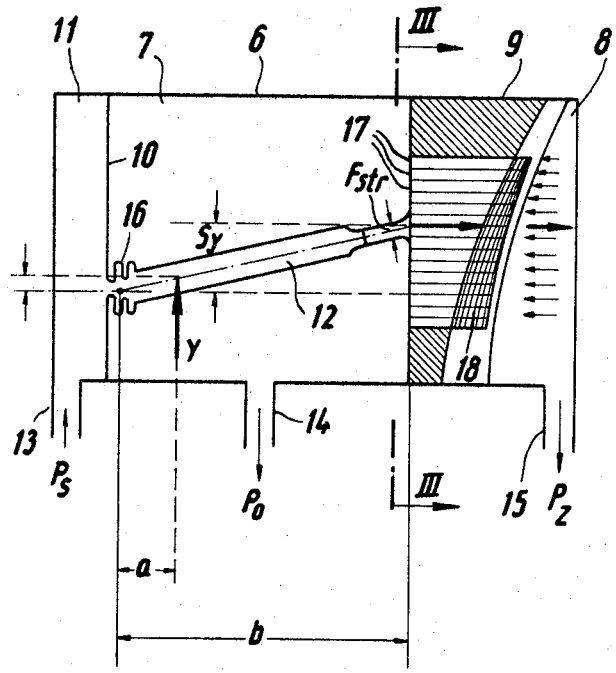
FIG. 2 illustrates a function generator according to the invention with a jet pipe subjected to the diversion by the inputs $x, y$.

A function generator according to the present invention is diagrammatically illustrated in section in FIG. 2 and comprises primarily a housing 6 which by means of a partition 9 is subdivided into two main chambers 7 and 8. Said function generator furthermore comprises a chamber 11 separated by a partition 10 from the chamber 7, and a jet pipe 12 which is tiltably arranged in the chamber 7. The chamber 11 communicates continuously through a conduit 13 with a source of liquid of constant pressure $P_s$ (not shown in the drawing).

Figure 3:
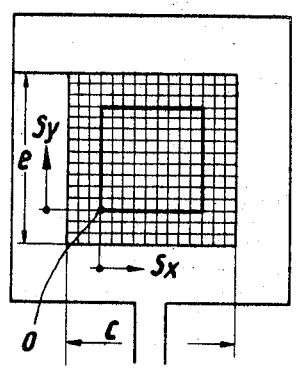
FIG. 3 is a section directed function generator of FIG. 2 taken along with the line III—III of FIG. 2.

By means of a device, not illustrated, the pressure $P_o$ in chamber 7 is likewise maintained constant and smaller than $P_s$. This constant pressure maintaining device may be omitted if pressure $P_s$ is selected sufficiently greater than atmospheric pressure that, as reference pressure $P_o$, atmospheric pressure may be employed. Finally, the chamber 8 in which the pressure $P_z$ prevails, $P_z$ representing the output, continuously communicates through conduit 15 with the inlet of a device for measuring the pressure $P_z$. The jet pipe 12 is supported on the partition 10, which separates the chambers 7 and 11 from each other, by means of a thin flexible corrugated pipe 16 in a yieldable manner so that only minor forces are necessary for tilting the jet pipe 12. The fluid passes from the chamber 11 through wall 10 and corrugated pipe 16 into the jet pipe 12 which extends through the chamber 7 and is directed toward a body 18 of narrowly bundled considerable number of narrow passages 17 of different length. The total cross sectional area of passages 17 of said body 18 is the surface $F = exc$ (see FIG. 3). The fluid which is under the pressure $P_s$ leaves the jet pipe 12 closely ahead of the body 18 in the form of a jet over small cross section $F_{str}$, said cross section being small relative to the surface F of the passage bundle 17. The passages 17 are so arranged that from a reference point O (See FIG. 3) a vertical direction upwardly, i.e., in the adjusting direction associated with the input $y$, the length of the passages increases, whereas in horizontal direction $x$ the length decreases toward the right. Furthermore, with each diversion of the fluid jet, the diversion being designated by distance $S_y$ in vertical direction and distance $S_x$ in horizontal direction; the core of the jet impacts upon a passage of a certain length. Each impact area thus has associated therewith a certain diversion of the jet pipe 12 from the basic position corresponding to the reference point 0 (FIG. 3). The diversion of the jet pipe fundamentally, is principally effected by the inputs $x$ and $y$ which act upon the jet pipe 12 at a distance $a$ from the tilting point of the pipe 12. The movement of the free end of jet pipe 12 is designated $S_y$ in the vertical direction and $S_x$ in the horizontal direction.

The operation is as follows: The fluid jet at any diversion will with the cross section of $F_{str}$ impact upon the left side of the body 18 and will bring about that due to the overpressure occurring at the impact area, which over pressure with a short length of the jet assumes approximately the value $P_s$ minus $P_o$, the passages 17 within the range of the impact area will be passed through by the jet and the fluid will pass through the already filled chamber 8. Since practically no fluid flows from chamber 8 through conduit 15, under the conditions just described fluid will be displaced into the chamber 7 through the passages of the body 18 which were not passed through by the jet. As a result, the pressure $P_z$ increases to the extent of $P_z$ minus $P_o$. This increase in pressure will be the greater the more fluid passes per time unit into the chamber 8. Thus, at a constant difference $P_s$ minus $P_o$ the pressure increase will be dependent on the medium length of the passages which are passed through in the direction toward chamber 8. The pressure difference $P_z$ minus $P_o$ which represents the output $z$ of the function generator is thus a function of the input $x$ and $y$ bringing about the jet diversion or deviation. The function value $z$ is obviously more precisely predictable the smaller the cross sectional dimension of the passages are with regard to the maximum occurring values of $S_x$ and $S_y$ and the better the pressures $P_s$ and $P_o$ can be maintained constant.

The pressure $P_z$, representing the output, will thus vary from a maximum, which approaches $P_s$ to a minimum, which approaches $P_o$.

Depending upon the nature of the function $z = F(x,y)$, an increase in $x$ or $y$ may move the jet toward shorter ones of passages 17, or longer ones thereof.

The function generator of FIG. 4 structurally corresponds fundamentally to the generator of FIG. 2. The control jet again leaves the pipe 20 which extends almost through the entire chamber 19. The deviation or diversion of pipe 20 in horizontal and vertical direction is effected by spring bellows 21 acted upon by the inputs $x$ and $y$. Of the spring bellows 21, only the horizontal spring bellows has been shown. The function generator is followed by a fluidic amplifier 28 through a laminary throttle 22 for conveying the changes of pressure $P_z$. The arrangement of an amplifier in this way is advantageous because it has no parts which would cause friction losses.

The particular features of the function generator shown in FIGS. 5 and 6 consists in that the control jet 24 passes through the chamber associated therewith all the way as a jet and at its root, as particularly shown in FIG. 6 is deviated or diverted by two flat liquid jets 25 and 26. This function generator has no moveable parts at all. Jet 24, in the case of FIGS. 5 and 6, is preferably liquid.

Figure 7:
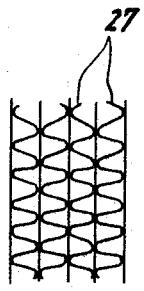
FIGS. 7 and 8 indicate possibility for the formation of the passage bundle in the partition.
Figure 8:
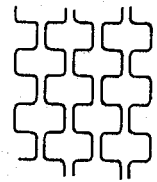

FIG. 7 shows a passage bundle which is built up of solid or welded corrugated sheet metal 27. FIG. 8 shows another possibility of building up a passage bundle according to which the corrugated sheets 28 are cemented to each other.

It is, of course, to be understood that the present invention is, by no means, limited to the particular showing in the drawings but also comprises modifications within the scope of the appended claims.

I claim:

1. A function generator adapted to receive two inputs and to supply an output in conformity therewith and comprising: a housing, a partition in the housing dividing it into first and second chambers, said partition having a passage bundle comprising a plurality of closely grouped passages extending therethrough and affording communication between said first and second chambers and providing for laminar fluid flow through the partition, said passages increasing in length from one side of said bundle to the other when viewed in longitudinal cross section in two planes at an angle to each other, means for supplying a jet of fluid at constant pressure to the side of said passage bundle facing said first chamber, said jet in cross sectional area being a small fraction of the area of said passage bundle, said second chamber being closed and means for maintaining the pressure in said first chamber constant pressure less than that of said jet whereby fluid from said jet flows through said passage bundle into said second chamber and then returns to said first chamber via the region of the passage bundle which is not impacted by said jet, control means responsive to each said input for diverting said jet transversely relative to said passage bundle in a direction parallel to a respective one of said planes, the pressure in said second chamber comprising said output, and means for measuring the pressure in said second chamber.

2. A function generator according to claim 1 in which said planes extend at right angles to each other and said means responsive to said inputs are also arranged to act at right angles to each other.

3. A function generator according to claim 1 in which said jet of fluid is a gaseous jet.

4. A function generator according to claim 1 in which said jet of fluid is a liquid jet.

5. A function generator according to claim 1 in which a pipe is provided having a nozzle at one end for supplying said jet, said one end of said pipe being located adjacent the side of said partition facing said first chamber, support means tiltably supporting the other end of said pipe, and said control means acting on said pipe to tilt it about its said tiltable support.

6. A function generator according to claim 5 in which said support means is a flexible elastic tubular element connected at one end to the wall of said housing on the opposite side of said first chamber from said partition and connected at the other end to the said other end of said pipe.

7. A function generator according to claim 5 in which said inputs are pressures and said control means comprise fluid pressure operable means connected to said pipe to cause tilting movement thereof, said inputs being connected to supply pressure to respective ones of said fluid pressure operable means.

8. A function generator according to claim 4 in which said liquid jet traverses substantially the full length of said first chamber before impacting against said passage bundle, and said control means comprising control jets directed toward said liquid jet near the root thereof.

9. A function generator according to claim 8 in which said control jets are in the form of flat jets with the greater length of each thereof extending transversely to the direction of said liquid jet so the liquid jet will remain within the range of said control jets in all deviated positions of said liquid jet.